May 18, 1965
D. R. JAMES
3,183,955
CITRUS JUICE EXTRACTING MACHINE HAVING MEANS
FOR SEPARATING JUICE AND PULP FROM PEEL
Filed Feb. 25, 1963
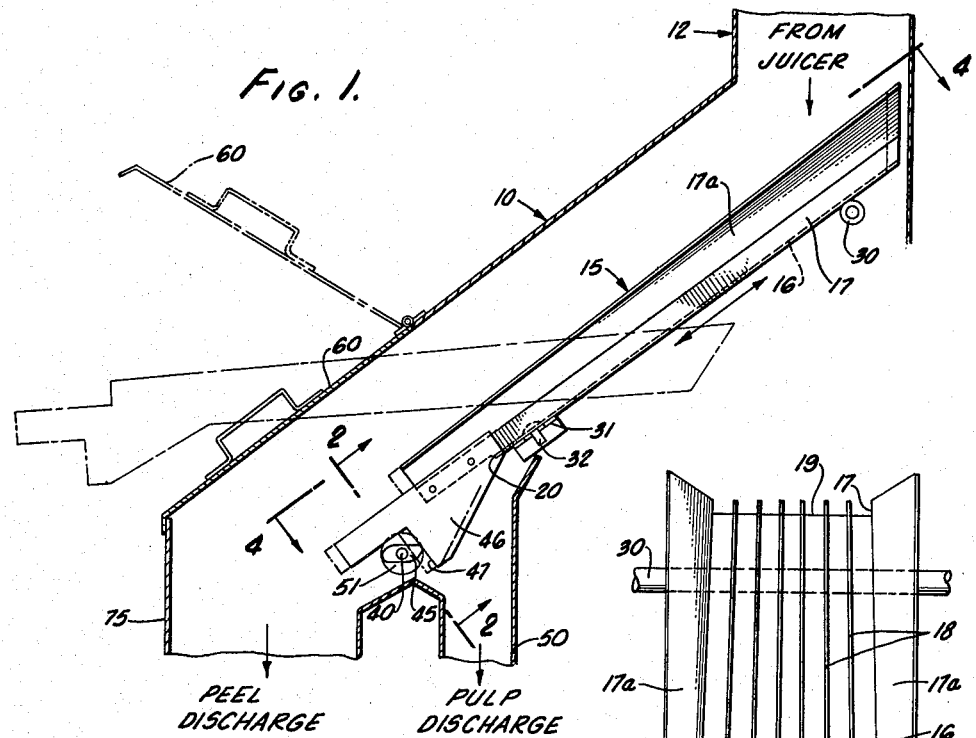
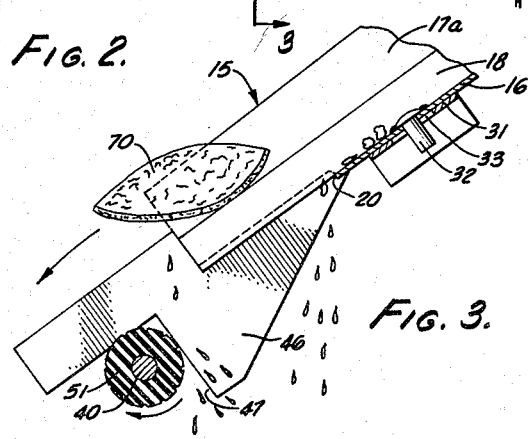
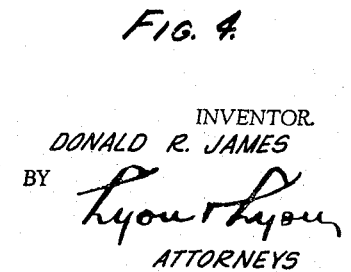
INVENTOR.
DONALD R. JAMES
BY
*Lyon & Lyon*
ATTORNEYS

United States Patent Office

3,183,955
Patented May 18, 1965

3,183,955
CITRUS JUICE EXTRACTING MACHINE HAVING MEANS FOR SEPARATING JUICE AND PULP FROM PEEL
Donald R. James, Covina, Calif., assignor to Brown Citrus Machinery Corporation, Whittier, Calif., a corporation of California
Filed Feb. 25, 1963, Ser. No. 260,498
11 Claims. (Cl. 146—3)

This invention relates to citrus juice extracting machines and has particular reference to improved means in citrus juice extracting machines for separating the juice-depleted peel from the fruit pulp.

In the operation of industrial citrus juice extracting machines grid means are generally provided for separating the extracted juice and pulp from the peel. However, these grid means are not wholly satisfactory in that if the grid wire spacing is close enough to assure clean separation between the juice and the peel segments, much of the valuable pulp is separated along with the peel and is lost. Conversely, if the grid wire spacing is sufficiently great to permit the pulp particles to flow through with the juice, then some of the peel segments or particles also pass through the grid and contaminate the juice. An important object of the present invention is, therefore, to provide an improved grid means which overcomes the above and other disadvantages of those used heretofore.

Another object of the present invention is to provide a novel oscillating grid for the efficient separation of citrus peel from the citrus pulp and juice extracted therefrom in a citrus juice extracting machine.

A further object of the present invention is to provide a novel oscillating separator grid which is adapted to be used with all types of citrus juice extracting machines.

Other objects and advantages of this invention it is believed will be readily apparent from the following detailed description of a preferred embodiment thereof when used in connection with the accompanying drawings.

In the drawings:

FIGURE 1 is a side elevation, partly in vertical section, of the apparatus of this invention.

FIGURE 2 is a sectional view taken substantially on the line 2—2 of FIGURE 1.

FIGURE 3 is a sectional view taken substantially on the line 3—3 of FIGURE 2.

FIGURE 4 is a sectional view taken substantially on the line 4—4 of FIGURE 1.

Referring now to the drawings, the apparatus of the present invention includes a housing 10 of sheet metal or the like attached to the outlet 12 of a juice extracting machine (not shown, but which, for example can be of the type disclosed in Wells Patent 2,631,625). In those machines including a grid or other means for the clean separation of juice and some pulp from the peel and the remaining pulp, the outlet 12 comprises the peel and pulp outlet of the machine. If desired, all of the machine's output of juice, pulp and peel can be delivered through the outlet 12.

Mounted within the housing at an angle to the horizontal is the oscillating grid 15 which comprises a bottom plate 16, a pair of side places 17 having outwardly and upwardly flared plate portions 17a and a plurality of spaced grid members or vanes 18 extending from the upper end 19 of the bottom plate to points beyond the lower end 20 of the bottom plate. The side plates 17 diverge slightly in the downward direction, i.e., the spacing between the lower ends of the plates 17 is somewhat greater than that between the upper ends thereof. The same is true of the adjacent pairs of vanes 18; each vane is spaced somewhat further from its adjacent vane at the bottom than at the top so as to provide a plurality of downwardly diverging passages therebetween.

The grid 15 is supported on the citrus juice extracting machine frame (not shown) for reciprocation in the directions of the double arrow of FIGURE 1 by means of an upper support rod 30 secured to the machine frame and a lower support plate 31 also secured to the machine frame, lateral alignment of the grid being maintained by means of a pair of rivet members 32 secured to the bottom plate 16 and extending into slots 33 provided in the plate 31.

Means are provided for longitudinally oscillating or reciprocating the grid, and as shown in the drawings, these means may include a shaft 40 extending across the housing and suitably driven from the citrus juice extracting machine motor (not shown) in the direction of the arrow of FIGURE 3. Carried adjacent one end of the shaft is a cam 45, and carried on one of the side plates 17 and forming a continuation of the lower end thereof is a cam follower member 46, said member having an end surface 47 adapted to be contacted by the cam.

Means are provided for assisting in the ejection of the fruit pulp out through the pulp discharge chute 50, and as shown in the drawings, these means may include the ribbed roller 51 which is carried on the shaft 40, the roller being thus positioned vertically below the lower end 20 of the grid bottom plate.

The housing is provided with an access door 60 adapted to be swung to the open position shown by the phantom lines of FIGURE 1, permitting removal of the grid 15 therethrough, as shown by the further phantom lines of FIGURE 1. Thus, the grid may be readily removed for the necessary periodic cleaning operation.

In operation of the apparatus of the present invention, the peel segments, pulp and more or less juice, depending upon the specific structure of the citrus juice extracting machine itself, is delivered to the grid 15 through the outlet 12. Since the spacing between the vanes 18 is less than the minimum overall dimension of the peel segments, the segments remain on top of the vanes, whereas the pulp particles and juice fall between the vanes and are thus prevented from being swept along with the peel. During operation, the grid 15 is oscillated continually between the solid and phantom line positions, going through two complete oscillations during each revolution of the shaft 40 and cam 45. Because of the frictional relationship between the grid and its support members 30 and 31, the downward movement of the grid lags slightly behind the rotation of the cam, so that with each revolution, the cam strikes the cam follower a sharp blow, moving the grid upwardly with each blow and thus imparting a series of quick upward and rearward movements to the grid so as to assist the gravity forces acting upon the peel and pulp to move them downwardly toward the discharge end of the grid. As the peel and pulp continues to be moved along the grid, the peel, as shown at 70 in FIGURE 3, drops off the ends of the vanes 18 and falls by gravity into the peel discharge chute 75. The pulp and juice fall from the end 20 of the bottom plate and into the chute 50, the roller 51 contacting any errant pulp particles and forcing them back into the proper chute 50.

Having fully described my invention, it is to be understood that I do not wish to be limited to the details set forth but my invention is of the full scope of the appended claims.

I claim:

1. In combination with a citrus juice extracting machine of the type adapted to extract juice and pulp from citrus fruit and to discharge citrus peel segments, pulp particles and juice therefrom, the pulp particles being smaller in size than the minimum overall dimensions of the peel segments: a grid positioned to receive peel segments and pulp particles discharged from said machine, said grid comprising a bottom plate inclined at an angle from the horizontal, a plurality of laterally spaced vanes extending longitudinally along said plate and generally perpendicular thereto, the spacing between adjacent vanes being less than the minimum overall dimensions of the peel segments, and means for longitudinally oscillating said grid.

2. The apparatus of claim 1, wherein the plate has an upper and a lower end, and a housing including a pulp discharge chute below the lower end of said plate.

3. The apparatus of claim 2, including a driven roller member mounted adjacent the lower end of said plate, said roller being driven in a direction to urge pulp into said chute.

4. The apparatus of claim 2, wherein said vanes extend beyond the lower end of said plate.

5. The apparatus of claim 2, said vanes extending beyond the lower end of said plate, said housing including a peel discharge chute below the lower ends of said vanes.

6. The apparatus of claim 3, said vanes extending beyond the lower end of said plate, said housing including a peel discharge chute below the lower ends of said vanes, and wherein said roller is interposed between the pulp discharge chute and the peel discharge chute.

7. The apparatus of claim 2, wherein the spacing of the vanes increases in a downward direction.

8. The apparatus of claim 1, wherein said oscillating means comprises a cam follower on said grid and a cam operably connected thereto.

9. The apparatus of claim 7, wherein said oscillating means comprises a cam follower on said grid and a cam operably connected thereto, said cam being adapted to impart a series of blows to said follower.

10. The apparatus of claim 6, wherein said oscillating means comprises a cam follower on said grid and a cam operably connected thereto.

11. A grid for separation of peel segments and pulp particles discharged from a citrus juice extracting machine, the pulp particles being smaller in size than the minimum overall dimensions of the peel segments, said grid comprising a bottom plate, said plate having an upper and a lower end, a plurality of laterally spaced vanes extending longitudinally along said plate and generally perpendicular thereto, the spacing between adjacent vanes being less than the minimum overall dimensions of the peel segments, means for longitudinally oscillating said grid, a housing including a pulp discharge chute positioned below the lower end of said plate, and a driven roller member mounted adjacent the lower end of said plate, said roller being driven in a direction to urge pulp into said chute.

References Cited by the Examiner
UNITED STATES PATENTS

| | | |
|---|---|---|
| 2,205,059 | 6/40 | Clark. |
| 2,374,456 | 4/45 | Ravndal et al. |
| 2,769,472 | 11/56 | Alexander et al. _____ 146—3 |
| 3,106,291 | 10/63 | Tisch _____ 209—97 X |

J. SPENCER OVERHOLSER, *Primary Examiner.*